UNITED STATES PATENT OFFICE.

HANS LYNCKE, OF BERLIN, GERMANY; SOPHIE LYNCKE HEIRESS OF SAID HANS LYNCKE, DECEASED.

DRY VISCOSE IN A GRANULAR, SOLUBLE, AND STABLE CONDITION AND PROCESS OF PREPARING THE SAME.

1,074,881.     Specification of Letters Patent.     Patented Oct. 7, 1913.

No Drawing.     Application filed April 16, 1908. Serial No. 427,392.

*To all whom it may concern:*

Be it known that I, HANS LYNCKE, a subject of the King of Prussia, residing at 5 Lutherstrasse, Berlin, Germany, have invented certain new and useful Improvements in Dry Viscose in a Granular, Soluble, and Stable Condition and Process of Preparing the Same, of which the following is a specification.

By the existing methods alkali-cellulose xanthate, *i. e.* the compound resulting from the action of carbon bisulfid on alkali-cellulose can only be obtained in a dry state as a tough substance which cannot be pulverized by mechanical means. In this state the xanthate is obtained, for instance, from its solution ("viscose"). Besides it is known that the xanthate, when dissolved in water, undergoes rapid decomposition, alkali and carbon bisulfid being eliminated and the original $C_6$—compound changing into the less soluble $C_{12}$, $C_{18}$, etc.—compounds. Therefore the product as prepared from the aqueous solution no longer represents the original compound but is materially changed and has become less soluble, all the more as the drying process, too, requires considerable time and can only be carried out at a comparatively high temperature.

The present invention relates to a new process by which all inconveniences may be removed and the dry viscose obtained as a granular powder in such a way, that the least possible decomposition takes place. The product obtained by this new process is comparatively stable.

It forms slowly in 10 to 20 times its amount of solution of soda lye (of about 5% by weight) a viscous solution. The formation of the solution may be hastened by stirring or shaking. It is easily soluble in water provided it has only been kneaded with alcohol, while by repeatedly washing it out with alcohol sodium hydroxid is removed from the alkali-cellulose-xanthate.

In carrying out this invention, not viscose, but the crude undissolved alkali-cellulose xanthate is used; this is subjected, before being dissolved, to an intensive kneading with an alcohol, preferably ethyl alcohol. It has been found, that in this way the xanthate is reduced to small granular particles which may be separated from the liquid and dried without decomposition. In this firm condition the product resists outward influences to such an extent that it may be kept for a comparatively long period without undergoing decomposition, remaining soluble in water or dilute solutions of alkali.

By the direct treatment with alcohol the xanthate is preserved as the original compound; besides other impurities the small quantity of water left over from the previous use of sodium hydrate solution is removed, thus the product may be dried in a short time.

A suitable way of carrying out the new process is as follows: In the usual manner, as for instance, according to Cross and Bevan's methods, cellulose is first soaked in a solution of sodium hydrate, the surplus of which is then squeezed off. After being stored for several hours the alkali-cellulose thus obtained is converted into xanthate by means of carbon bisulfid. This is mixed, in a kneading machine (for example the well known kneading machine with tilting frame of Werner and Pfleiderer, of Kannstadt, Wurttemberg, Germany) with crude or purified ethyl alcohol of say 96%, the quantity of the latter being about three times as much in weight as the original cellulose; the alcohol is then squeezed off. When triturated, the product falls to granular pieces and dries quickly at a temperature of 70-80° or less (preferably in a vacuum), after which it may be further powdered or not. The kneading with alcohol may be repeated, if necessary, and thus a pure preparation may easily be obtained at the cost of a comparatively small quantity of alcohol.

The repeated treatment with alcohol is not necessary, but advantageous, because the freeing of the viscose from the impurities which affect its stability is more thorough. If the product is colored dark, a further kneading with alcohol is desirable.

The use of a stable dry viscose is various, but for example it may be employed in the production of photographic films, finishing or surfacing means as glue in the production of paper, for artificial silk, artificial horse hair, artificial leather, horn and the like.

A process is already known in which viscose, or a solution of cellulose xanthate is treated with alcohol. In that process, however, the alcohol is employed for precipitating the xanthate from its solution, whereas in the present process, the raw undissolved xanthate is kneaded with alcohol.

What I claim and desire to secure by Letters Patent of the United States, is:—

1. A process of preparing dry viscose in a granular, soluble, and stable condition, such process consisting in kneading the crude undissolved xanthate with an alcohol, separating it from the liquid and then drying it.

2. A process of preparing dry viscose in a granular, soluble, and stable condition, such process consisting in kneading the crude undissolved xanthate with ethyl alcohol, separating it from the liquid and then drying it.

3. A process of preparing dry viscose in a granular, soluble, and stable condition, such process consisting in kneading the crude undissolved xanthate with an alcohol, separating it from the liquid and then drying it in a vacuum.

4. As a new article of manufacture dry viscose, in a hard and stable condition being free from water and forming clear viscose solutions in dilute soda lye even after storing for months.

In testimony whereof I have hereunto set my hand in presence of two subscribing witnesses.

HANS LYNCKE.

Witnesses:
HENRY HASPER,
WOLDEMAR HAUPT.